US007952765B2

(12) United States Patent
Klassen

(10) Patent No.: US 7,952,765 B2
(45) Date of Patent: May 31, 2011

(54) METHOD OF DETECTING PAGES SUBJECT TO RELOAD ARTIFACT

(75) Inventor: R Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/243,845

(22) Filed: Oct. 1, 2008

(65) Prior Publication Data

US 2009/0022524 A1 Jan. 22, 2009

Related U.S. Application Data

(62) Division of application No. 10/998,098, filed on Nov. 24, 2004, now Pat. No. 7,542,172.

(51) Int. Cl.
*G06T 5/00* (2006.01)

(52) U.S. Cl. ............ 358/3.26; 358/1.9; 399/60; 399/49; 399/27

(58) Field of Classification Search .................. 358/1.9, 358/3.26, 3.27; 399/60, 49, 27
See application file for complete search history.

(56) References Cited

U.S. PATENT DOCUMENTS

| | | | | |
|---|---|---|---|---|
| 5,548,663 | A | 8/1996 | Sekine et al. | |
| 5,851,719 | A | 12/1998 | Takei et al. | |
| 5,887,221 | A * | 3/1999 | Grace | 399/49 |
| 5,923,932 | A | 7/1999 | Williams | |
| 6,816,687 | B1 * | 11/2004 | Dalal et al. | 399/49 |
| 2003/0228177 | A1 | 12/2003 | Hirsch | |
| 2004/0170442 | A1 | 9/2004 | Forbes, II et al. | 399/27 |

FOREIGN PATENT DOCUMENTS

EP 0 915 390 A2 5/1999

* cited by examiner

*Primary Examiner* — King Y Poon
*Assistant Examiner* — Jamares Washington
(74) *Attorney, Agent, or Firm* — Oliff & Berridge, PLC

(57) ABSTRACT

A method for determining if an image to be printed is subject to reload artifact, includes providing an image (which may be a low resolution version of the image) to be printed; locating within the image a first area to be printed requiring toner of sufficient quantity to cause reload of the donor roll; locating within the image a second area substantially one rotation of the donor roll subsequent to the first area; determining if the second region is a region of high area toner coverage, wherein high area toner coverage comprises toner coverage exceeding a predetermined threshold value; if the second region is a region of high area toner coverage, determining if the second region contains high frequency content; if the second region contains high frequency content, the second region is not subject to reload artifact; else the second region is subject to reload artifact.

12 Claims, 9 Drawing Sheets

FIG. 3
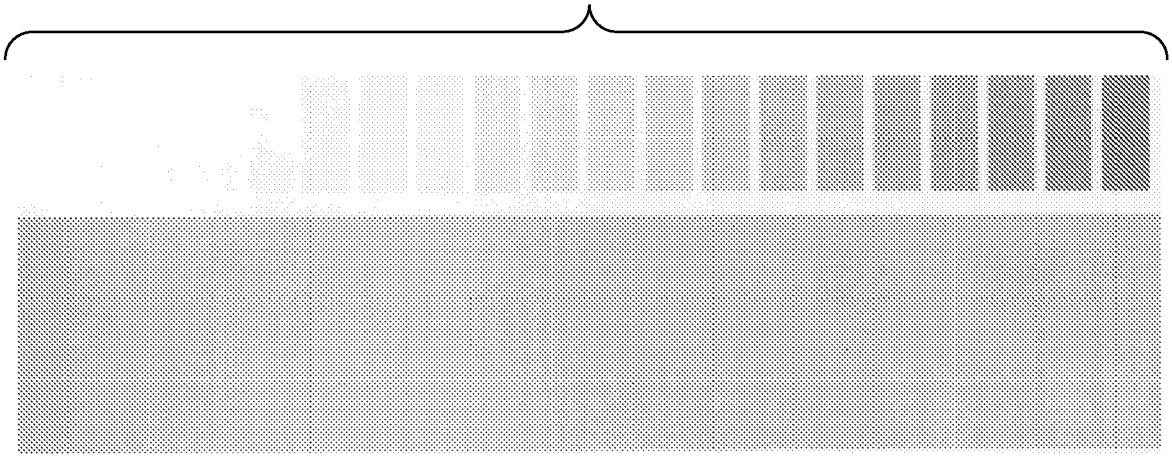
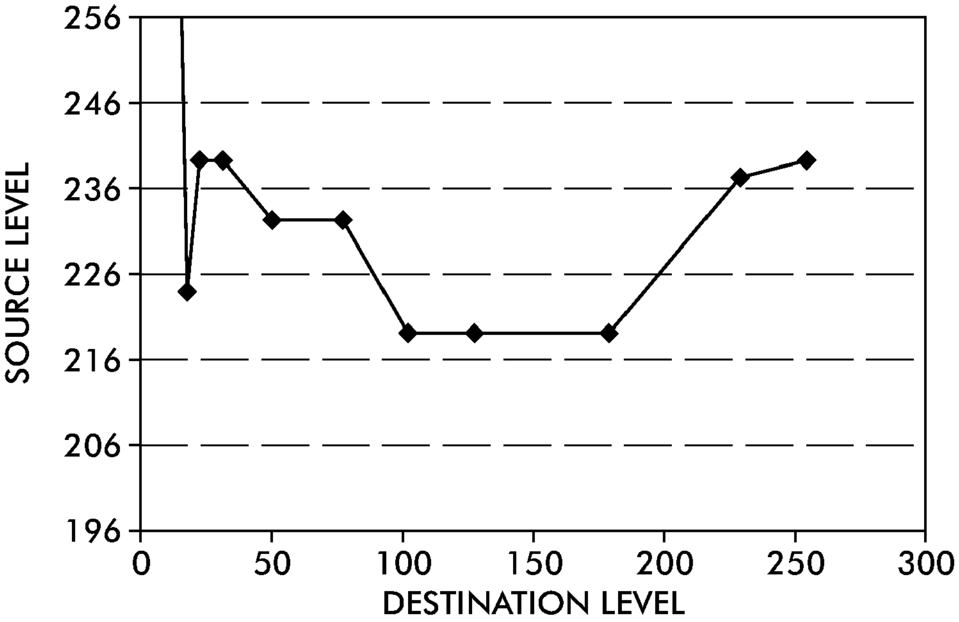
FIG. 4

METHOD OF DETECTING PAGES SUBJECT TO RELOAD ARTIFACT

CROSS-REFERENCE TO RELATED APPLICATIONS

This application is a divisional of U.S. application Ser. No. 10/998,098 filed Nov. 24, 2004. This application is related to co-pending, co-assigned U.S. patent application Ser. No. 10/998,099 to R. Victor Klassen for "Method of Detecting Pages Subject to Reload Artifact with IOI (Image to Image) Correction", which is filed the same date as this application, the contents of which are incorporated herein in its entirety and made a part hereof.

BACKGROUND

This disclosure is related generally to method for detecting printing artifacts, and more particularly to a method for detecting artifacts caused by toner reload.

In electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as toner. Toner is held on the image areas by the electrostatic charge on the photoreceptor surface. Thus, a toner image is produced in conformity with a light image of the original being reproduced. The toner image may then be transferred to a substrate or support member (e.g., paper) and the image affixed thereto to form a permanent record of the image to be reproduced. In the process of electrophotographic printing, the step of conveying toner ("developer") to the latent image on the photoreceptor is known as "development."

On some color electrophotographic printers, low area coverage (LAC) documents result in reduced developer life. A primary driver of developer life in LAC documents is magnetic roll speed. Reducing magnetic roll speed increases developer life, but leads to an artifact known as reload, which only occurs on some documents. Toner in the housing has an effective age, depending both on magnetic roll speed (aging more slowly for lower speeds) and on residence time in the housing. The effective age of the toner controls the ability of the toner to be developed. Reload artifact results when the toner on the donor roll is not all equally fresh. Currently, reload artifact is controlled by purging the toner regularly during low area coverage documents in order to refresh the toner in the developer housing. This prevents reload but results in lost productivity due to slower printing times and costs for the additional toner that is purged.

SUMMARY

Disclosed in embodiments herein, in an electrophotographic printing system employing a magnetic roll for providing toner to a donor roll, a method for determining if an image to be printed is subject to reload artifact, include providing a portion of an image to be printed; locating a source region capable of causing reload within the image portion; and locating a destination region capable of exhibiting reload substantially one rotation of the donor roll subsequent to the source region within the image portion. Locating a source region capable of causing reload within the image portion includes determining a coverage level of the source region; and comparing the coverage level of the source region to a source threshold, such that if the coverage level of the source region is at least as great as the source threshold, the source region is capable of causing reload. Similarly, locating a destination region capable of exhibiting reload includes determining a coverage level of the destination region; and comparing the coverage level of the destination region to a destination threshold, such that if the coverage level of the destination region is at least as great as the destination threshold, the destination region is capable of exhibiting reload.

If the electrophotographic printing system further includes a second donor roll, the method may include locating a second destination region capable of exhibiting reload substantially one rotation of the second donor roll subsequent to the source region within the image portion. Locating a second destination region capable of exhibiting reload includes determining a coverage level of the second destination region; and comparing the coverage level of the second destination region to a second destination threshold, such that if the coverage level of the second destination region is at least as great as the second destination threshold, the second destination region is capable of exhibiting reload. Alternatively, if the electrophotographic printing system includes a second donor roll, the method may include locating a second source region capable of causing reload substantially one rotation of the second donor roll prior to the destination region within the image portion. Locating a second source region capable of causing reload may include determining a coverage level of the second source region; and comparing the coverage level of the second source region to a second source threshold, such that if the coverage level of the second source region is at least as great as the second source threshold, the second source region is capable of causing reload.

In an electrophotographic printing system employing a magnetic roll for providing toner to a donor roll, a method for determining if an image to be printed is subject to reload artifact, according to another embodiment, includes, for each separation of the image: providing a low resolution version of the image to be printed; locating within the low resolution version of the image a source object to be printed, wherein the source object requires toner of sufficient quantity to cause reload of the donor roll at some subsequent location on the image; locating within the low resolution version of the image a destination object a predetermined distance from the source object; determining a destination coverage of toner to be deposited over a local area at the destination object; if the destination coverage is less than a predetermined reload value: determining a dimension of the source object; determining a dimension of the destination object; comparing the dimension of the source object is to a predetermined critical source dimension; and comparing the dimension of the destination region to a predetermined critical destination dimension.

In an electrophotographic printing system employing a magnetic roll for providing toner to a donor roll, a method for determining if an image to be printed is subject to reload artifact, according to another embodiment, includes providing a portion of an image to be printed; locating within the image portion, a first area to be printed requiring toner of sufficient quantity to cause reload of the donor roll; locating within the image portion, a second area substantially one rotation of the donor roll subsequent to the first area; determining if the second region is a region of high area toner coverage, wherein high area toner coverage comprises toner coverage exceeding a predetermined threshold value; if the second region is a region of high area toner coverage, indicating that the second region is subject to reload artifact.

A portion of the image may be provided, or the entire image may be provided. In one embodiment, it may be desirable to provide only a low resolution version, such as a one-eighth resolution thumbnail of the image. If the second region is subject to reload artifact, the magnetic roll may be set to full speed if not, the magnetic roll may be set to a reduced speed.

In accordance with another embodiment, the image to be printed may include a template portion and a variable data portion. In this embodiment the entire image may be provided, locating a source region capable of causing reload within the image portion comprises locating a source region in the template portion, and locating a destination region capable of exhibit reload may include locating a destination region in the variable data portion.

In an electrophotographic printing system employing a magnetic roll for providing toner to a donor roll, a method for determining if an image to be printed is subject to reload artifact, according to yet another embodiment, includes, for each separation of the image: providing a low resolution version of the image to be printed; locating within the low resolution version of the image a source object to be printed, wherein the source object requires toner of sufficient quantity to cause reload of the donor roll at some subsequent location on the image; locating within the low resolution version of the image a destination object a predetermined distance from the source object; determining a minimum destination coverage of toner to be deposited over a local area at the destination object; if the minimum destination coverage is less than a predetermined reload value: determining a dimension of the source object; determining a dimension of the destination object; if the dimension of the source object is greater than a predetermined critical source dimension and the dimension of the destination area is greater than a predetermined critical destination dimension, then the destination object is subject to reload artifact.

In addition to electrophotographic printing systems, reload artifact may be present in other printing systems, such as ink jet or solid ink printing systems. For example, an artifact similar to reload artifact may occur in a printing system in which ink (or some other fluid) is metered onto a roller and portions of the roller used on a previous revolution are insufficiently replenished, unless a higher rate of ink flow is maintained.

In a printing system employing a roll for providing a fluid to a donor roll, a method for determining if an image to be printed is subject to reload artifact, according to another embodiment, includes providing a portion of an image to be printed; locating within the image portion, a first area to be printed requiring fluid of sufficient quantity to cause reload of the donor roll; locating within the image portion, a second area substantially one rotation of the donor roll subsequent to the first area; determining if the second region is a region of high area fluid coverage, wherein high area fluid coverage comprises toner coverage exceeding a predetermined threshold value; if the second region is a region of high area toner coverage, indicating that the second region is subject to reload artifact.

The method detects pages (images) that would be subject to reload if the magnetic roll speed were reduced. The method operates by examining a low resolution version of the image and finding areas where there is toner of sufficient quantity to cause reload and one donor roll revolution later there is also toner of sufficient quantity to exhibit reload. In addition, areas of sufficiently high frequency content have not been observed to exhibit reload, so high frequency content may be detected in places where reload might occur. If there is enough high frequency content, those locations are considered reload-free. Further, isolated spots of less than a predetermined distance, for example, one mm in linear dimension tend not to be visible, so these may be ignored as well. When a separation contains one location with reload potential it is not examined further.

BRIEF DESCRIPTION OF THE DRAWINGS

FIG. 3 illustrates printed patches inducing reload on a subsequent printed patch;

FIG. 4 is a graph of minimum source coverage required to cause reload as a function of destination coverage;

DETAILED DESCRIPTION

Figure 1:
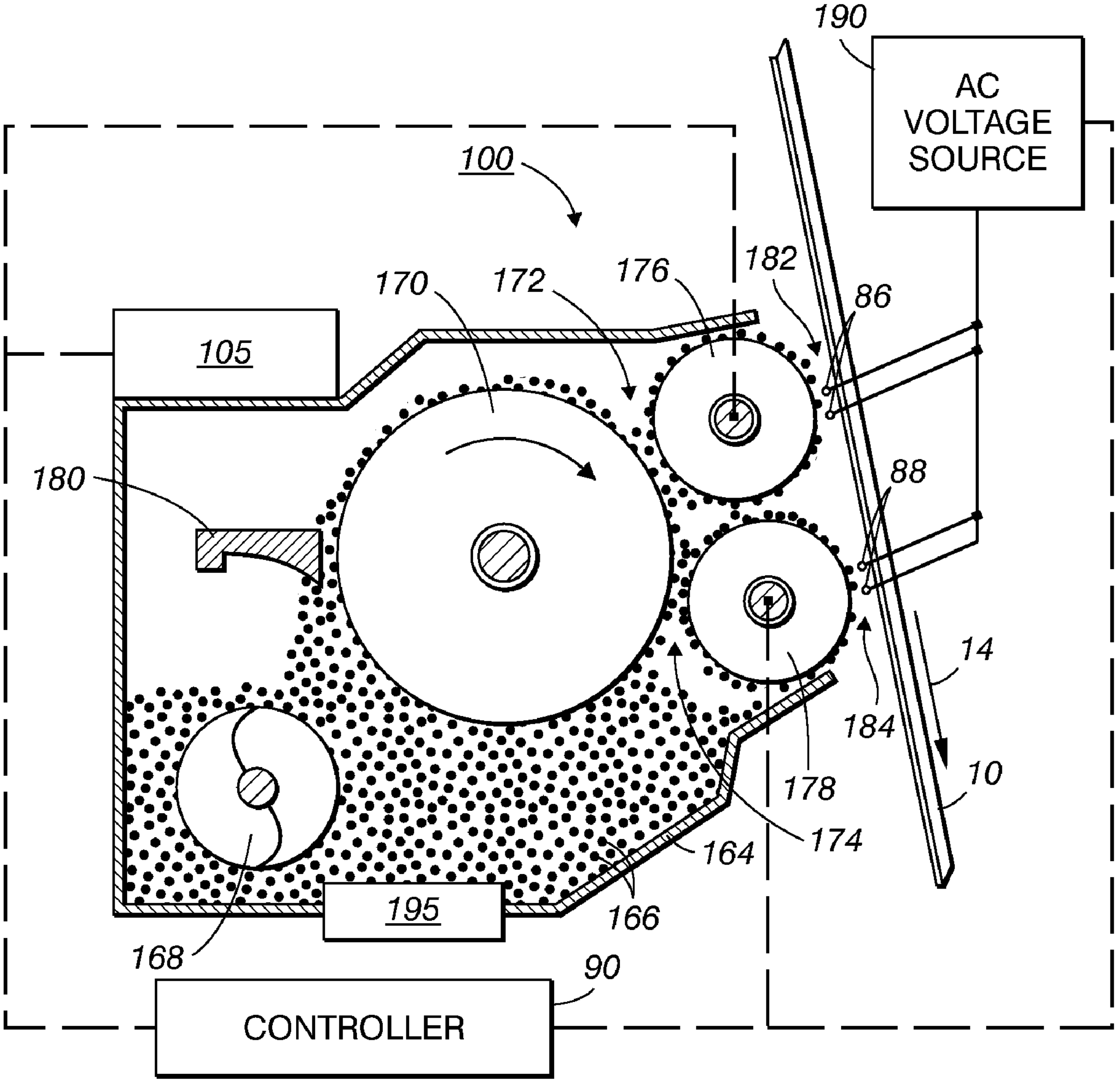
FIG. 1 is a drawing illustrating details of a Hybrid Scavengeless Development (HSD) developer apparatus.

To understand the reload artifact problem, it is useful to understand the toner development process. Referring now to FIG. 1, there are shown the details of a Hybrid Scavengeless Development (HSD) developer apparatus 100. Briefly reviewing, HSD technology deposits toner onto the surface of a donor roll via a conventional magnetic brush. The donor roll generally consists of a conductive core covered with a thin (50-200 micron) partially conductive layer. The magnetic brush roll is held at an electrical potential difference relative to the donor core to produce the field necessary for toner development. Applying an AC voltage to one or more electrode wires spaced between the donor roll and the imaging belt provides an electric field which is effective in detaching toner from the surface of the donor roll to produce and sustain an agitated cloud of toner particles about the wires, the height of the cloud being such as not to be substantially in contact with the belt. Typical AC voltages of the wires relative to the donor are 700-900 Vpp at frequencies of 5-15 kHz and may be applied as square waves, rather than pure sinusoidal waves. Toner from the cloud is then developed onto the nearby photoreceptor by fields created by a latent image. However, in another embodiment of the hybrid system, the electrode wires may be absent. For example, a hybrid jumping development system may be used wherein an AC voltage is applied to the donor roll, causing toner to be detached from the donor roll and projected towards the imaging member surface.

Continuing with FIG. 1, apparatus 100 includes a reservoir 164 containing developer material 166. The developer material may be either of the one component or two component type. For purposes of discussion, developer material 166 is of the two component type, that is it comprises carrier granules and toner particles; however, it should be appreciated that single component developer may also be used. The two-component developer material 166 may be of any suitable type. The use of an electrically conductive developer can eliminate the possibility of charge build-up within the developer material on the magnetic brush roll, which, in turn, could adversely affect development at the second donor roll. In one embodiment, the two-component developer consists of 5-15 micron insulating toner particles, which are mixed with 50-100 micron conductive magnetic carrier granules such that the developer material includes from about 90% to about 99% by weight of carrier and from 10% to about 1% by weight of toner. By way of example, the carrier granules of the developer material may include a ferromagnetic core having a thin layer of magnetite overcoated with a non-continuous layer of resinous material. The toner particles may be made from a resinous material, such as a vinyl polymer, mixed with a coloring material.

The reservoir includes augers, indicated at 168, which are rotatably-mounted in the reservoir chamber. Augers 168 serve to transport and to agitate the material within the reservoir and encourage the toner particles to charge and adhere triboelectrically to the carrier granules. Magnetic brush roll 170 transports developer material 166 from the reservoir to loading nips 172, 174 of donor rolls 176, 178. Magnetic brush rolls are well known, so the construction of roll 170 need not be described in great detail. Briefly the roll includes a rotatable tubular housing within which is located a stationary magnetic cylinder having a plurality of magnetic poles impressed around its surface. The carrier granules of the developer material are magnetic and, as the tubular housing of the roll 170 rotates, the granules (with toner particles adhering triboelectrically thereto) are attracted to the roll 170 and are conveyed to the donor roll loading nips 172, 174. Metering blade 180 removes excess developer material from the magnetic brush roll and ensures an even depth of coverage with developer material before arrival at the first donor roll loading nip 172.

At each of the donor roll loading nips 172,174, toner particles are transferred from the magnetic brush roll 170 to the respective donor roll 176,178. The carrier granules and any toner particles that remain on the magnetic brush roll 170 are returned to the reservoir 164 as the magnetic brush continues to rotate. The relative amounts of toner transferred from the magnetic roll 170 to the donor rolls 176, 178 can be adjusted, for example by: applying different bias voltages to the donor rolls; adjusting the magnetic to donor roll spacing; adjusting the strength and shape of the magnetic field at the loading nips and/or adjusting the speeds of the donor rolls.

Each donor roll transports the toner to a respective development zone 182,184 through which the photoconductive belt 10 passes. At each of the development zones 182, 184, toner is transferred from the respective donor roll 176, 178 to the latent image on the belt 10 to form a toner powder image on the latter. Various methods of achieving an adequate transfer of toner from a donor roll to a latent image on an imaging surface are known and any of those may be employed-at the development zones 182, 184. Transfer of toner from the magnetic brush roll 170 to the donor rolls 176, 178 can be encouraged by, for example, the application of a suitable D.C. electrical bias to the magnetic brush and/or donor rolls. The D.C. bias (for example, approximately 70 V applied to the magnetic roll) establishes an electrostatic field between the donor roll and magnetic brush rolls, which causes toner particles to be attracted to the donor roll from the carrier granules on the magnetic roll.

In the device of FIG. 1, each of the development zones 182, 184 is shown as having a pair of electrode wires 186, 188 disposed in the space between each donor roll 176, 178 and belt 10. The electrode wires may be made from thin (for example, 50 to 100 micron diameter) stainless steel wires closely spaced from the respective donor roll. The wires are self-spaced from the donor rolls by the thickness of the toner on the donor rolls and may be within the range from about 5 micron to about 20 micron (typically about 10 micron) or the thickness of the toner layer on the donor roll.

For each of the donor rolls 176 and 178, the respective electrode wires 186 and 188 extend in a direction substantially parallel to the longitudinal axis of the donor roll. An alternating electrical bias is applied to the electrode wires by an AC voltage source 190. The applied AC establishes an alternating electrostatic field between each pair of wires and the respective donor roll, which is effective in detaching toner from the surface of the donor roll and forming a toner cloud about the wires, the height of the cloud being such as not to be substantially in contact with belt 10. The magnitude of the AC voltage in the order of 200 to 500 volts peak at frequency ranging from about 8 kHz to about 16 kHz. A DC bias supply (not shown) applied to each donor roll 176, 178 establishes electrostatic fields between the photoconductive belt 10 and donor rolls for attracting the detached toner particles from the clouds surrounding the wires to the latent image recorded on the photoconductive surface of the belt.

After development, excess toner may be stripped from donor rolls 176 and 178 by respective cleaning blades (not shown) so that magnetic brush roll 170 meters fresh toner to the clean donor rolls. As successive electrostatic latent images are developed, the toner particles within the developer material 166 are depleted. A developer dispenser 105 stores a supply of toner particles, with or without carrier particles. The dispenser 105 is in communication with reservoir 164 and, as the concentration of toner particles in the developer material is decreased (or as carrier particles are removed from the reservoir as in a "trickle-through" system or in a material purge operation as discussed below), fresh material (toner and/or carrier) is furnished to the developer material 166 in the reservoir. The auger 168 in the reservoir chamber mixes the fresh material with the remaining developer material so that the resultant developer material therein is substantially uniform with the concentration of toner particles being optimized. In this way, a substantially constant amount of toner particles is in the reservoir with the toner particles having a constant charge. Developer housing 164 may also include an outlet 195 for removing developer material from the housing in accordance with a developer material purge operation as discussed in detail below. Outlet 195 may further include a regulator (not shown) such as an auger or roller to assist in removing material from the housing.

Various sensors and components within developer apparatus 100 are in communication with system controller 90, which monitors and controls the operation of the developer apparatus to maintain the apparatus in an optimal state. In addition to voltage source 190, donor rolls 176 and 178, magnetic brush roll 170, augers 168, dispenser 105 and outlet 195, system controller 90 may, for example, communicate with a variety of sensors, including, for example, sensors to measure toner concentration, toner charge, toner humidity, the voltage bias of the developer material, bias of the magnetic brush roll, and the bias of the donor roll.

Figure 2:
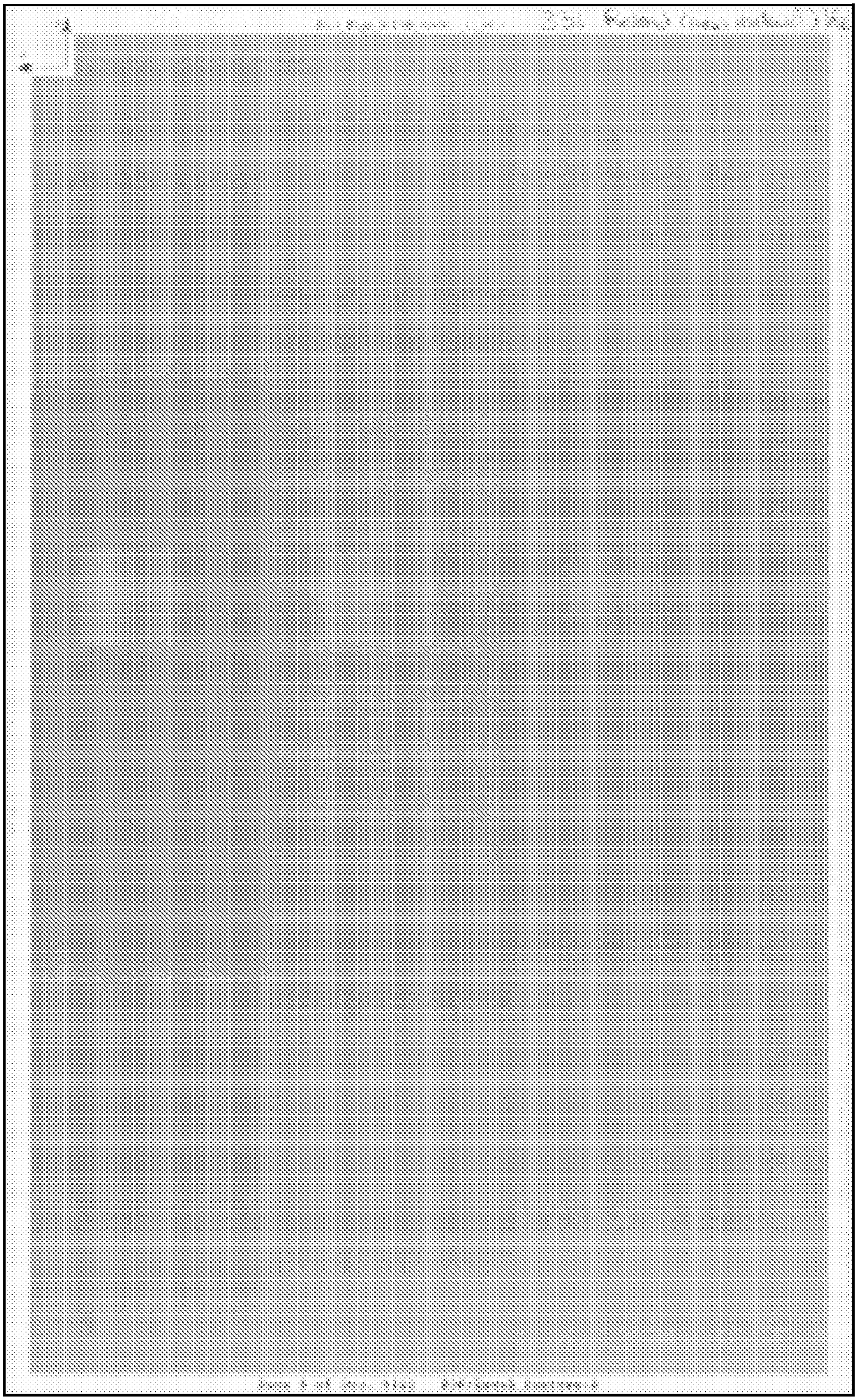
FIG. 2 is an example of a printed test page exhibiting the artifact known as reload.

Each donor roll rotates and when it completes a full rotation, the donor roll has toner with a different charge/mass ratio than in regions where the toner has been on the roll for multiple revolutions. In particular, the developability may be less for toner in regions of the roll where toner was removed during the previous revolution. This leads to the possibility of a reload artifact, which appears as a light area in the later region. (In the print example shown in FIG. 2, there is a reload artifact which appears as a vertical stripe 61 mm later on the page than the region where toner was removed).

Part of the source of the problem is the speed of rotation of the magnetic roll. While high area coverage jobs need the magnetic roll to transfer toner continuously from the supply system to the donor rolls, low area coverage jobs do not, and the toner churning caused by the continuous motion of the magnetic roll prematurely ages the toner, which causes it to be more prone to reload artifacts. The exact details of the physical processes involved are not relevant to this discussion. It is sufficient to say that there is a part of the printing system which, if slowed down, will make reload worse when it happens and if left at full running speed, will make reload happen sooner (i.e., the developer materials will reach a state conducive to reload sooner).

In some electrophotographic configurations the problem is complicated further by having two donor rolls, where each donor roll rotates at a different speed. In this situation, the reload artifact will cause one discontinuity at one distance (for example, 51 mm, and possibly at multiples of 51 mm, say 104 mm) after a discontinuity in image content, corresponding to the length of rotation of the first donor roll. There will also be another discontinuity at a second distance (for example, about 63 mm and possibly at multiples thereof, say 126 mm) corresponding to the length of rotation of the second donor roll.

An example of a type of image which may produce a reload artifact found in many customer documents is a page containing a horizontal stripe in landscape mode. This stripe may be related to the identity of the customer and contain a logo. A stripe can be any graphic element that is relatively strong in toner concentration, limited in height, and spanning a significant width of the page in landscape mode. PowerPoint slides often contain such stripes. Typically the remainder of the page will contain a constant mid-grey with a moderate amount of content (e.g., a graph). A reload artifact will be present in the form of a "shadow" of the stripe that appears in the mid-grey region. In a long-edge feed system (or two-up short edge feed), a horizontal stripe on a portrait mode page will interfere with itself in a similar manner.

The following definitions are useful in characterizing the reload artifact problems. Source is a location on the page where toner might be removed from the donor roll, causing reload at some later position on the page. Source object is a character, graphical object or image or portion thereof whose pixels act as the source. Destination is a location a fixed distance later on the page than the corresponding source. Typically the fixed distance is a function of the circumference of the donor roll. Minimum source coverage is a digital value defining the amount of toner deposited over a local area at the source, only sufficient that for some destination coverage value, reload will occur. Minimum destination coverage is a digital value defining the amount of toner requested to be deposited over a local area at the destination only sufficient that for some source coverage value, reload will occur. One might expect that the minimum destination coverage would depend on the source coverage, but it appears to have limited dependence. Critical source dimension is the (one dimensional) minimum size over which the minimum source coverage must be maintained before reload will be visible. The other dimension is assumed to have infinite size. Critical destination dimension is the (one dimensional) minimum size over which the minimum destination coverage must be maintained before reload will be visible.

There are several reasons why a reload artifact might not be visible (even if the system were to produce it). First, the amount of toner replaced on the donor roll might be small; this may occur when the source object is rendered with a light tint, or when the source object has very little spatial extent. Either the source is less than the minimum source coverage, or the source object is smaller than the critical source dimension. Second, the amount of toner needed at the destination may be small enough that the reduced developability of the toner on the roll does not reduce the amount of toner by enough to be visible ($\Delta E<0.2$). Third, there might be enough reload that it would be visible except that the high spatial frequency content at the destination masks the moderate errors in lightness. This may happen when the destination is a scanned image, except in the smoothest parts, or when the destination is text smaller than about 30 points (this paragraph is set in 10 point). It does not matter whether the reload is not visible due to masking in the human visual system or due to there being enough toner that the artifact is too small to be visible without masking.

The forgoing can be summarized: if the source object has more than the minimum source coverage, it may cause reload. Whether the source object causes reload also depends on whether it exceeds the critical source dimension. If the destination has more than the minimum destination coverage, it may exhibit reload. To exhibit reload, the destination object must also be larger than the critical destination dimension. If there is sufficient high frequency (or edge) information, the destination will not exhibit reload.

FIG. 3 shows an example of a scan of a print used to estimate the values of the minimum source and minimum destination coverages. FIG. 3 shows a series of patches on the upper portion which were used to induce reload artifact on the lower patch. The lead edge is at the top of FIG. 3. The solid patch on the bottom of FIG. 3 is at 40% coverage, and serves as the destination. The patches above it span a range of coverages. On each of 15 different sheets a different destination patch was printed, spanning the range from 1% to 100% coverage. (In this and all subsequent scans shown herein, the magnetic roll speed was 25% of full speed). The faint dark bands visible in the lower right portion of the 40% patch are where reload did not occur on that portion of the image. Reload occurred in the light regions between the thin dark bands. The reload-free regions are more obvious than the lightening caused by reload, but clearly, had there not been reload, the dark bands would not appear: the dark bands are the areas that printed as they should. The streaks on the left are at a higher spatial frequency and are thought to be unrelated to reload.

FIG. 4 is a graph of minimum source coverage required to cause a reload artifact as a function of destination coverage. At destinations below 13, no amount of source caused reload. FIG. 4 shows the lightest source coverage level of a visible band as a function of destination level. In all fifteen sheets the number of visible bands was constant to within measurement noise, unless there were no bands visible at all, as was the case for the lowest coverage cases. The lowest coverage pages that showed no reload had coverage of 5% or below; for no destination coverage level was there any reload visible for source coverages below 85%. Thus the minimum source coverage value appears to be 85%, while the minimum destination coverage value appears to be 5%.

Figure 5:
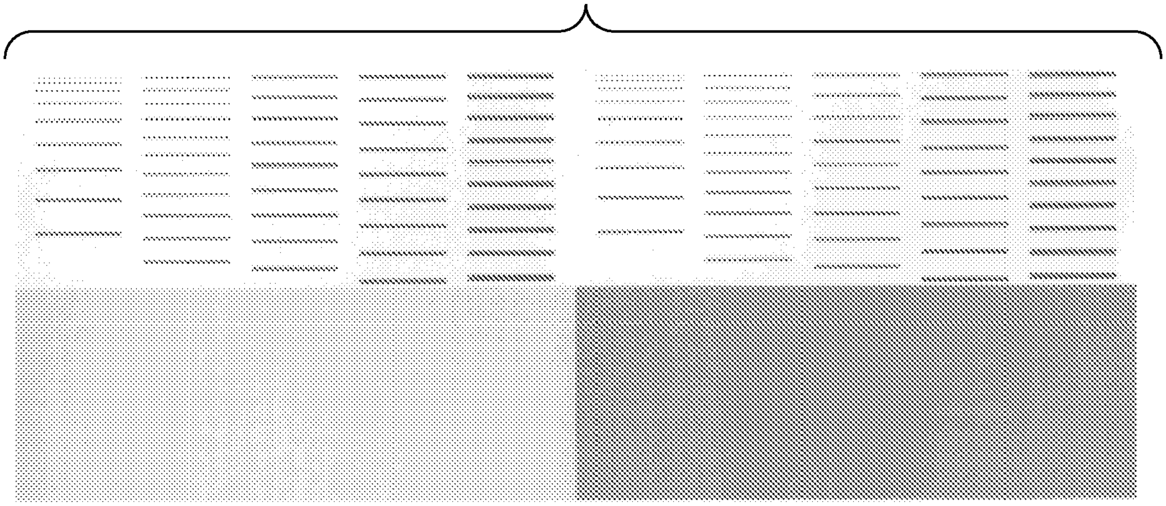
FIG. 5 illustrates a line thickness test.

Three tests were used to determine critical source and destination dimensions. The first appears in FIG. 5. FIG. 5 illustrates a line thickness test. All lines in the right most column of FIG. 5 induced reload in the patch below; all but possibly the topmost line in the second column from the right did. The thinnest line inducing reload is 1 mm thick. The thin horizontal lines serve as sources, while the large solid patches serve as destinations. Of the five columns of horizontal lines, all of the lines in the right most column induce reload, while most of the lines in the next column also induce reload. None of the lines in the three left most columns induce reload. The thickness of the thinnest line inducing reload is between 0.9 and 1 mm.

Figure 6:
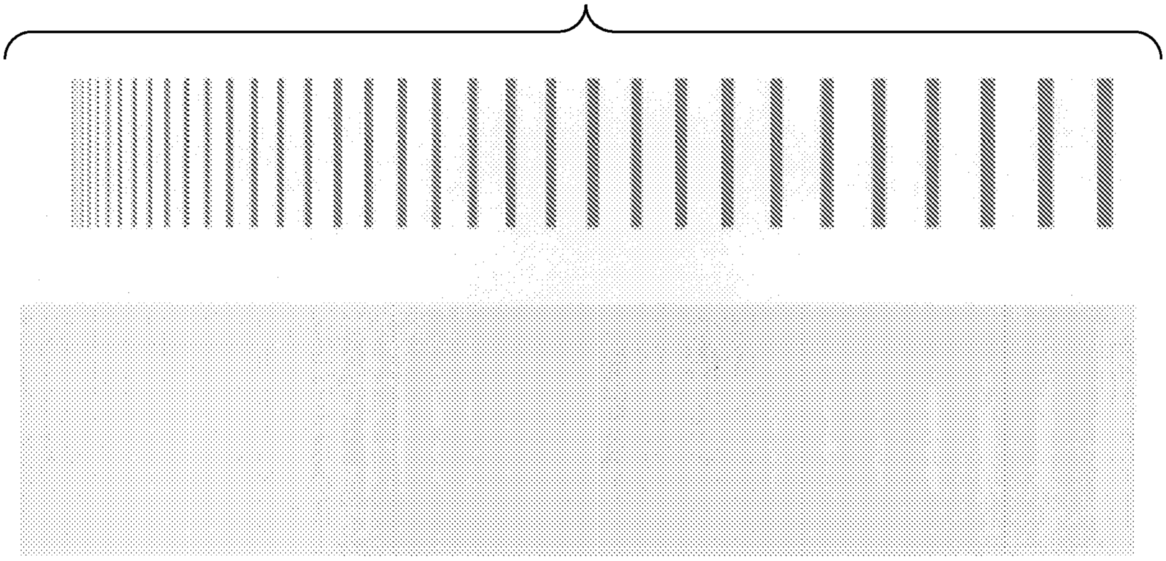
FIG. 6 illustrates a line thickness test for lines thicker than 1 mm.

The second test appears in FIG. 6. Lines thicker than 1 mm induced reload for this orientation as well. At least to first order, there is no effect of orientation on reload potential.

Figure 7:
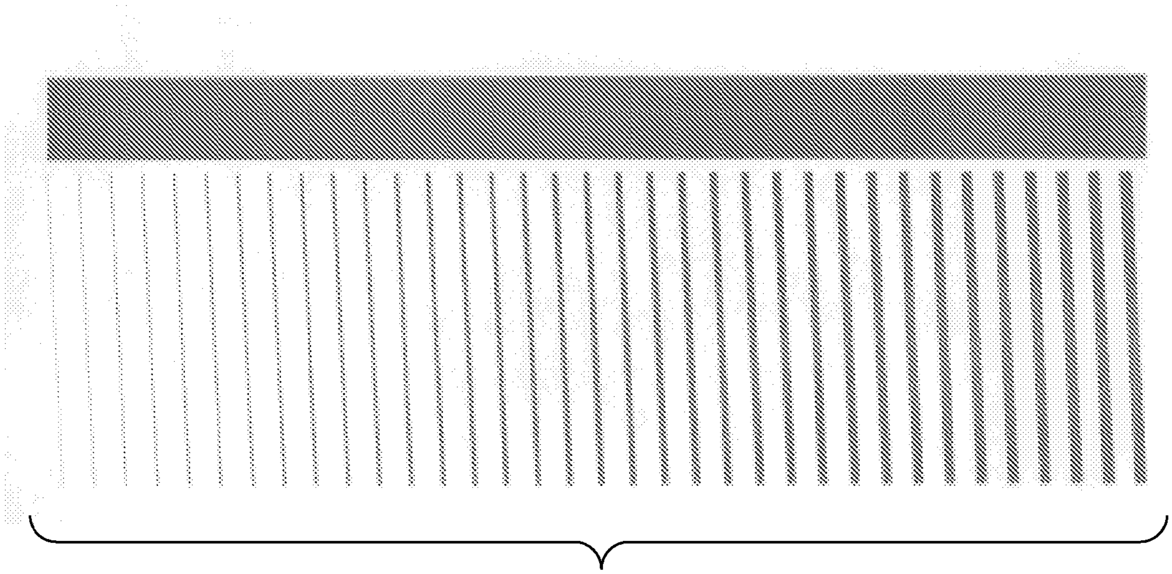
FIG. 7 illustrates a reload test with lines as the destination.

FIG. 7 illustrates a reload test with lines as the destination. Reload is present, although nearly invisible, on lines greater than 1 mm thick. Here all but the thinnest few lines induced reload, however the thickness of the thinnest line inducing reload is still approximately 1 mm. FIG. 7 tests the thickness of line required before reload can be induced on it. Line thickness is the destination critical dimension. As for FIGS. 4 and 5, the critical dimension is approximately 1 mm. However, where reload does appear on a 1 mm line, it is very difficult to see. From the digital values of the scan it is clear that a small amount of reload is occurring, but probably due to the high frequency content of the edge information, the visual detectability of a modest change in intensity is low.

Finally, a test target of text (not shown) was used both as source and destination. The largest point size (27 point Helvetica) had stroke widths over 1 mm; the next largest (18 point) had stroke widths just under 1 mm. The largest point size clearly induced reload on a solid patch following it, while the next largest either did not or it was very low visibility. It was very difficult to see reload on even the largest text, although some did occur.

From these tests it can be concluded that the critical dimensions for both source and destination, in this system configuration, is approximately 1 mm, to within 0.2 mm, regardless of orientation. The onset of reload beyond the critical dimension is not sudden and catastrophic, so the occasional object slightly above critical is unlikely to produce a visible artifact. These numbers are illustrative only, and may differ for different materials, geometric configurations, etc. of the development system. It should be understood that other critical dimensions may be found for other printing systems.

In the foregoing, only a single separation has been considered, in what might be a multiple separation printer. That is, while the printer may print with only one colorant, it might print with e.g., four, i.e., cyan, magenta, yellow, and black colorants. In the case of a multiple colorant printer, the exemplary reload detection method described with reference to FIG. 8 below would be repeated for each colorant.

Figure 8:
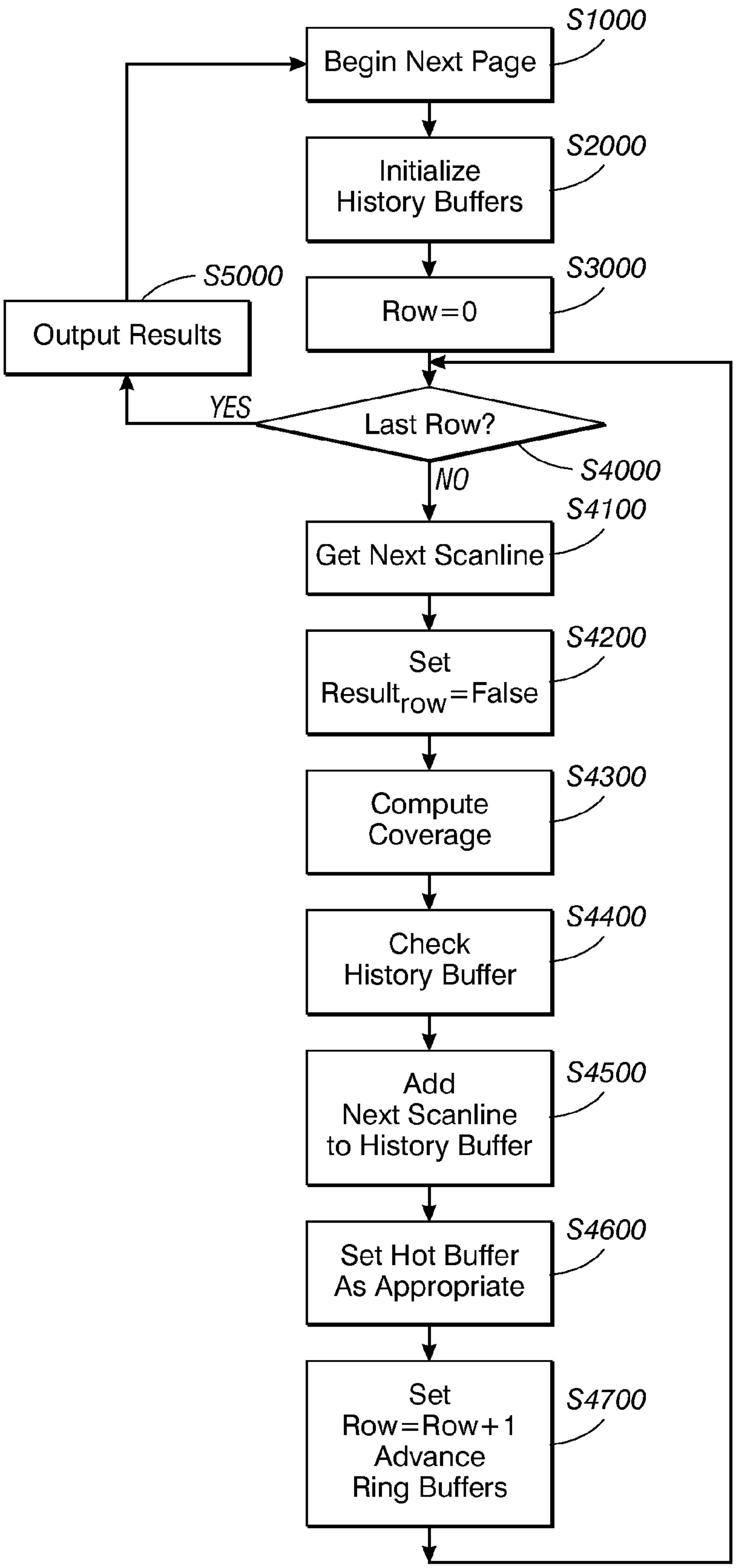
FIG. 8 is an illustrative flow chart of an exemplary method for detecting reload artifact.

Referring now to FIG. 8, an exemplary reload potential detection method is shown. The exemplary method operates by passing through a reduced resolution image looking for locations where there is more than the minimum source level, the appropriate number of scan lines before a location where there is more than the minimum destination level. Locations meeting that criterion are then checked for high spatial frequency content (for example, by using a simple edge detection filter), and if they lack high spatial frequencies, they may then be checked for neighbors that have also passed these tests. Where enough neighbors are found, the pixel is considered to have reload potential, and that separation of the image is flagged as having reload potential.

In the exemplary implementation, if a pixel has sufficient coverage to be a reload-causing source, then its neighborhood is considered, and if all neighbors have sufficient coverage, then that fact is stored. The right distance later, if the corresponding pixel has enough coverage to be a reload-exhibiting destination, (only considering pixels with corresponding reload-causing sources), then its neighborhood is considered. Here a check that all of the neighborhood has sufficient coverage is made, and that its edge content is low. At this point it is tentatively reload-causing. The next step is to look at any tentatively reload-causing pixel, and check its neighborhood. If they are tentatively reload-causing as well, the method is done, a reload-causing pixel has been found. The portion where neighboring pixels are checked to see whether they are tentatively reload-causing could be done by building a Boolean map (of results), where a location in the map is true if the corresponding pixel is reload causing, and then forming the logical AND of all locations in a neighborhood, thereby combining the neighboring results. Other implementations are possible.

The exemplary method uses a reduced resolution image, where the resolution is selected so that the minimum feature width corresponds to approximately three pixels wide. In an alternative embodiment the image might use a higher resolution image, including a full resolution image, in which case the neighborhoods used in the various tests would be correspondingly larger. In yet another embodiment, only a portion of the image might be used. For example, if a document is printing on a template, only the variable data portion need be examined since the template portion of the document is the same for each page. In such an embodiment, a reduced amount of data would be retained for the template portion, indicating which portions of the template might cause reload in the variable portion, and which portions might exhibit reload caused by the variable portion. At a later time (i.e., page assembly time), the variable portion would be checked to determine whether it would produce reload in the previously examined template portion, or exhibit reload due to the data found in the previously examined template portion.

For each separation (typically four), a ring buffer of prior scan lines is stored. The nth scan line in the ring buffer (counting from 0) contains the nth previous scan line to the one currently being examined for reload. These are referred to as the history buffers. A buffer of one Boolean value per separation per scan line may be used to indicate which scan lines have at least one pixel with the potential to cause reload. These buffers are referred to as the hot buffers. They are only used for efficiency. For each separation, at least one scan line of detection results is maintained, to provide a larger context than the current scan line's results. These are known as the reload buffers.

Referring now to the steps of the exemplary method of FIG. 8, at the start (step S1000) of each page, the history buffers are initialized (step S2000) with the assumption that there are control patches (patches used by the printer control software to maintain calibration) in the space immediately preceding the lead edge of the document. Control patches do not exhibit, but might produce, a reload artifact one rotation later. At step S3000, a row counter is set to 0. This counter is used to indicate the row within the page currently being processed. In step S4000, a determination is made as to whether the last row of the current page has just been processed. This may be done, e.g., by comparing the row counter to the number of rows in a page. If the last row has just been processed, processing continues with step S5000. If the last row has not been processed, processing continues with step S4100.

In step S4100, a next scanline is read, received or otherwise obtained. In step S4200, the result for this row is initialized to false. In optional step S4300, the coverage level for the next scanline is calculated. This may be done, e.g., by summing the values of the pixels in the next scanline. In step S4400, the history buffer is checked for reload potential. If reload potential is found, the result for this row is set to true. If coverage is not being computed, processing for this page may be stopped when reload potential is found. If processing does not stop, the next scanline is added (step S4500) to the history buffer, values are set in the hot buffer in step S4600, and processing continues to step S4700, where the value of row is increased by one and the ring buffers are advanced by one. Ring buffers are well known in the art: when a ring buffer is advanced, the entry that was at position i becomes the new entry at position i+1. After this processing returns to step S4000.

Continuing on with FIG. 8, at step S5000, if coverage is computed, the value of coverage over the entire page is reported, as well as a single Boolean value indicating whether reload potential was found anywhere on the page.

Figure 9:
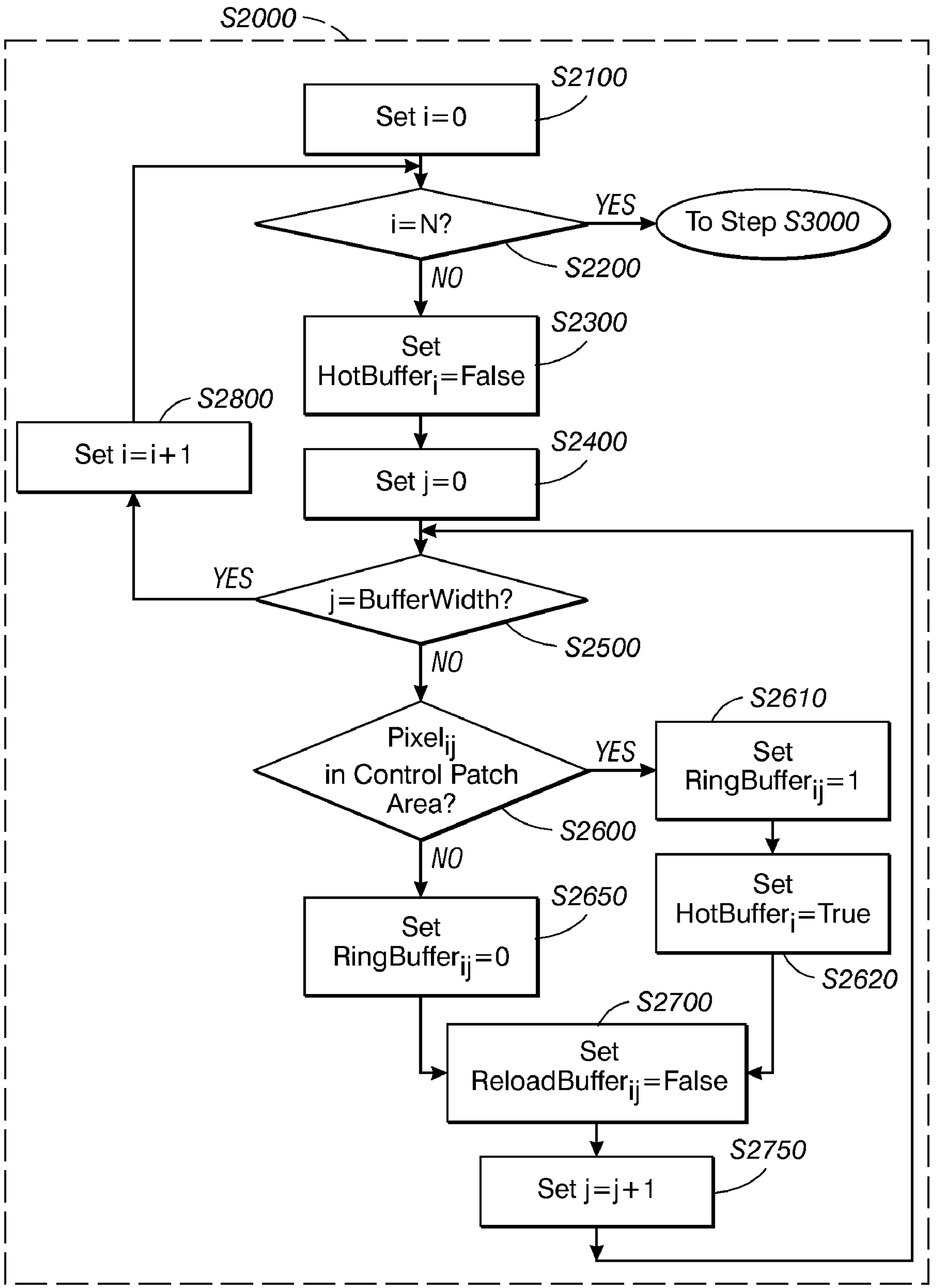
FIG. 9 is an illustrative flow chart of the initialization portion of the method in FIG. 8.

FIG. 9 shows additional detail of the initialization step S2000. The portion of the ring buffer corresponding to where the control patches would be is set to full on, since the actual values in the control patches is not known a priori. Other portions are initialized to 0. The hot buffers are set to true for those scanlines which are not zero in the corresponding history buffer. The reload buffers are initialized to false (no reload) for all pixels, scan lines and separations. Referring then to FIG. 9, in step S2100, a variable j is set to zero. This variable indicates the scanline within the ring buffers. In step S2200, the variable j is compared with N, the number of lines in the ring buffers. If j equals the number of lines in the ring buffers, processing continues with step S3000. Otherwise, processing continues with step S2300. In step S2300, the jth element of the array HotBuffer is set to false. This means that no marking material has been called for (so far) in the jth row of the ring buffer. In step S2400 a variable i is set to zero. This variable indicates the pixel within the current scanline. In step S2500 the variable i is compared with the number of pixels in a scanline. If j is the same as the number of pixels in a scanline, i is increased by one (S2800), and processing continues with step S2200. Otherwise, a determination is made whether location (i,j) is within the region of a control patch (step 2600). This is done by comparing the location to a known set of locations (not shown) where control patches may be located.

If the location is within the region of a control patch, processing continues with step S2610. Otherwise, processing continues with step S2650. In step 2610, location (i,j) in the ring buffer is set to 1 (full on), and in step S2620 the jth element of the array HotBuffer is set to true; in step S2650, location (i,j) in the ring buffer is set to 0. After either step 2620 or step 2650 processing continues with step 2700, where the (i,j) location in the reload buffer is set to false. Finally, in step 2750, j is incremented and processing passes back to step S2500.

Figure 10:
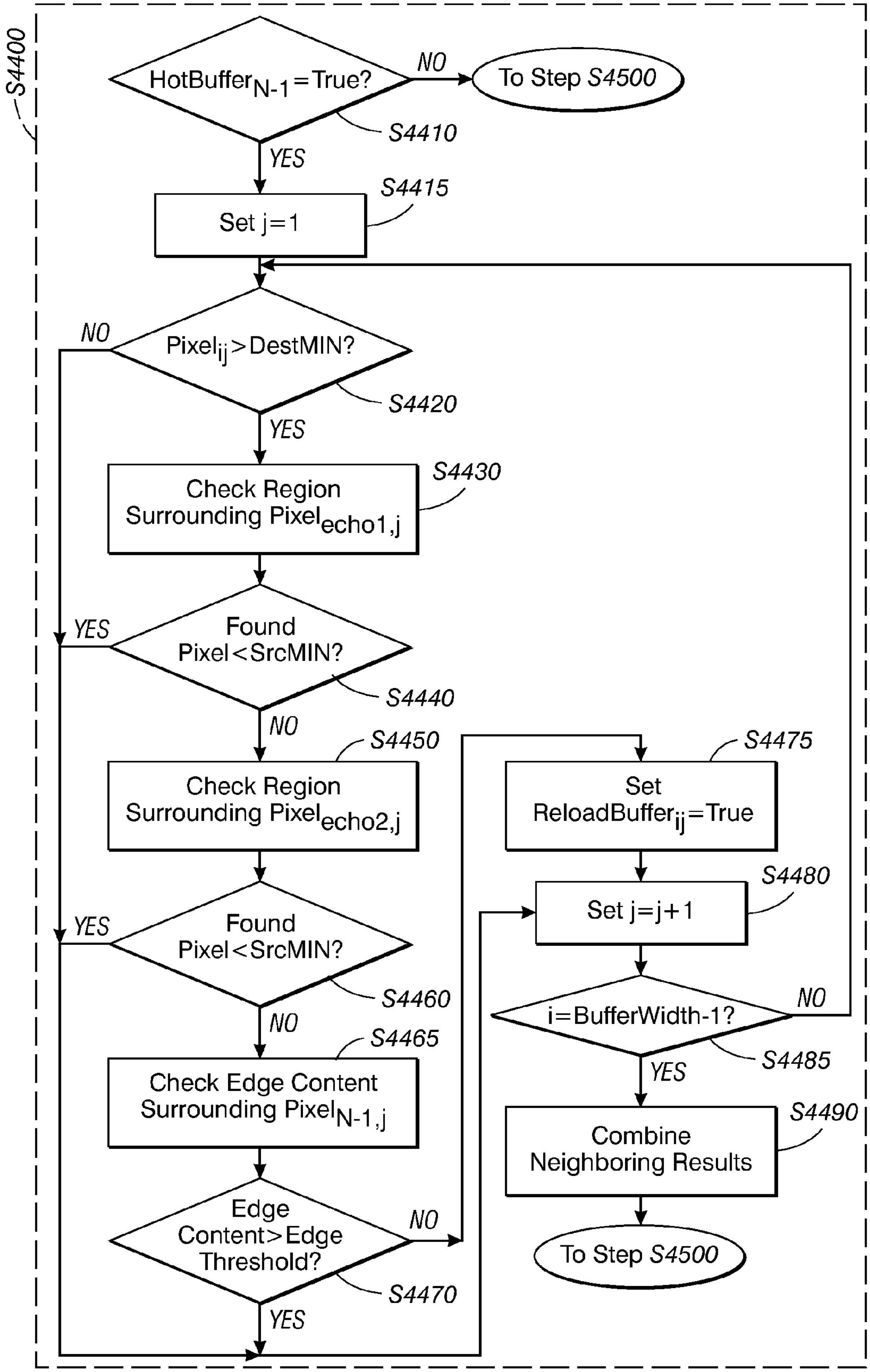
FIG. 10 is an illustrative flow chart of checking a history buffer.

FIG. 10 shows additional detail of step S4400. In step S4410, a determination is made whether the element in the array HotBuffer corresponding to the current scanline is true. It is true if and only if there was at least one pixel with a value greater than srcMin in a scanline either echo1 or echo2 before the current scanline. If the element in the array HotBuffer corresponding to the current scanline is false, no reload is possible for this scanline, and processing continues with the next scanline at step S4500. Otherwise, processing continues with step S4415, in which j is assigned a value 1. The variable j indicates which pixel is being considered, and j=1 corresponds to the second pixel in. In this way, a three by three neighborhood of the current pixel may be examined. It should be appreciated that if a larger neighborhood is to be examined, the initial value of j should be set to a correspondingly larger value. In step S4420, a determination is made whether the current pixel has a value greater than DestMin. If it does not, then no reload can occur on the current pixel, and processing continues at step S4480. If it does, processing continues with step S4430. In step S4430, the region surrounding the pixel in the history buffer at column j, and a row corresponding to a distance echo1 before the current scanline is examined. In this examination, the pixel with the minimum value in the neighborhood is found. In this embodiment, a 3×3 neighborhood is examined, i.e., all immediate neighbors of the pixel at column j and echo 1 before the current scanline. However it should be obvious to one versed in the art that a larger neighborhood could be examined, as indicated above in the discussion of step S4415. If any of the neighbors so examined has a value less than srcMin, the neighborhood is not entirely contained in a sufficiently large region of pixels greater than srcMin for reload to occur. Therefore, if the minimum found in step S4430 is less than srcMin, control passes (S4440) to step S4480. Otherwise, control passes (S4440) to step S4450. Step S4450 is exactly analogous to step S4430, except that the neighborhood examined is echo2 before the current scanline. Step S4460 is exactly analogous to step S4440. If the minima of both neighborhoods are sufficiently large, control passes to step S4465, where the edge content of the current pixel is tested.

This method may use any of the many edge detection methods in the art. Such methods provide a measure of edge content, which is relatively close to zero if there is no edge in the vicinity of a pixel, and relatively large if there is an edge or high frequency noise. In step S4470, the edge measure found in step S4465 is compared with a threshold, to determine whether there is enough edge content that reload, if present, would not be visible. If the edge content is above the threshold, control continues to step S4480. Otherwise control continues to step S4475, where the reload buffer is set to true for this pixel. This indicates that there might be a reload problem at this pixel. In step S4480, j is increased by one, and in step 4485 j is compared with the value corresponding to the location of the second last pixel in the buffer. If j is less than this value, processing continues with the next pixel in step S4420, otherwise, processing continues with step S4490. In step S4490, neighboring results are combined. A pixel continues to be considered to have reload potential if its neighbors to the right and to the left have reload potential (before this step), and if its neighbor in the previous scanline has reload potential.

Figure 11:
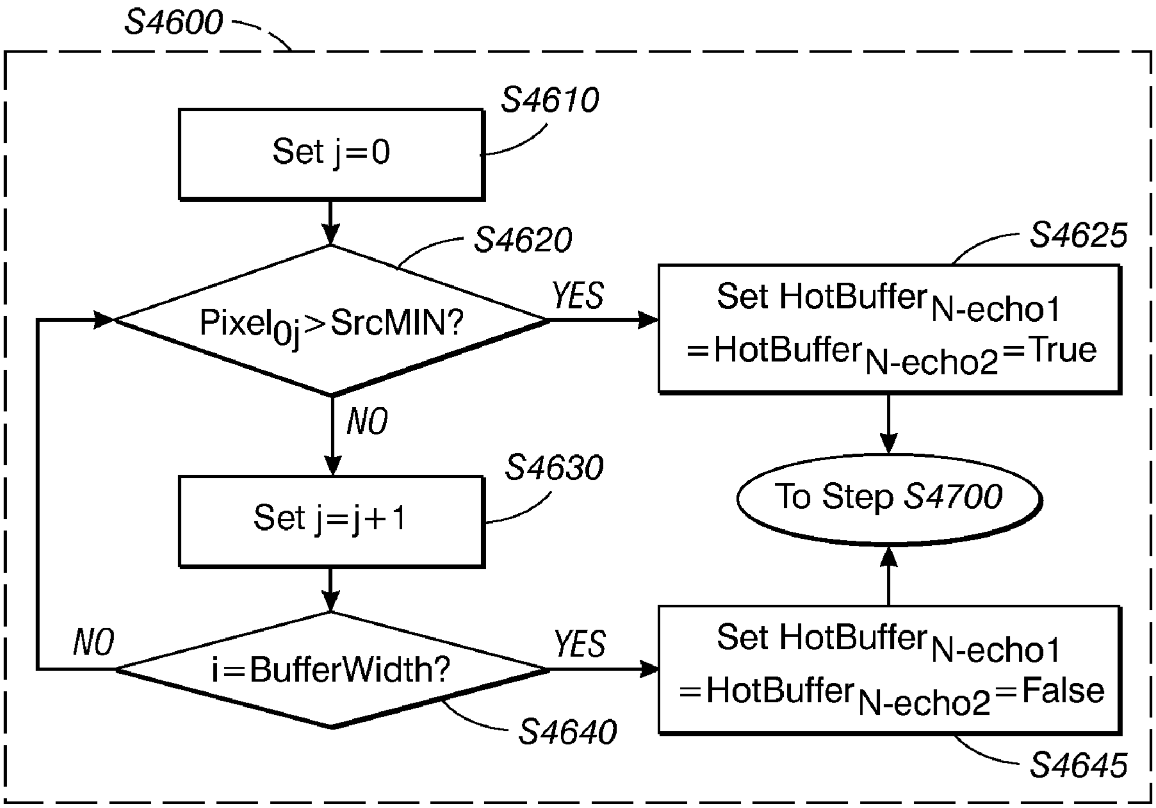
FIG. 11 is an illustrative flow chart of setting a hot buffer.

FIG. 11 shows additional detail of step 4600. In this step, the new scanline is searched for a pixel with a value greater than SrcMin. If such a pixel is found, the hot buffer is set so that when echo1 further scanlines have been input, or when echo2 further scanlines have been input the current entry in the hot buffer will be true. That is, in step S4610, a variable j is set to zero. This j indicates which pixel is being examined. In step S4620, a determination is made whether the current pixel has a value greater than SrcMin. If it does, processing continues with step S4625. Otherwise processing continues with step S4630. In step S4625, the entry in the HotBuffer corresponding to a distance echo1 is set to true, as is the entry in the HotBuffer corresponding to a distance echo2. In step 4630, j is increased by one, and control continues to step S4640, where a determination is made whether j is equal to BufferWidth (i.e., all pixels have been tested). If not, processing continues with step S4620, if so, processing continues with step S4645, where the entry in the HotBuffer corresponding to a distance echo1 is set to false, as is the entry in the HotBuffer corresponding to a distance echo2.

As indicated above, in step S5000, after all scan lines have been processed, the average coverage on the entire page (for each separation) and a single bit per separation indicating whether potential reload artifacts were identified are reported. These may be used in a feed forward mechanism, such as by using this information to slow down the magnetic roll, thereby increasing developer materials life. Alternatively the information might be reported to the customer to allow them to alter the page, to make it less likely to have reload potential.

Many commercially available digital front ends (DFE) have the ability to generate low resolution images for use in this method. In particular, ⅛th resolution "thumbnail" images of the pages as they are rasterized are produced for other applications and could be used in this method. The method described is ideally suited to read those images and generate signals to transmit to the control software.

In one embodiment, the DFE software may include the operation of computing a thumbnail image at some convenient size, for example one-eighth the original resolution. Either the DFE software itself, or a separate piece of software which the DFE software calls would read the thumbnail image and perform the desired image analysis on it.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. In an electrophotographic printing system employing a magnetic roll for providing toner to a donor roll, a method for determining if an image to be printed is subject to reload artifact, comprising, for each separation of the image:

providing a low resolution version of the image to be printed;

locating within the low resolution version of the image a source object to be printed, wherein the source object requires toner of sufficient quantity to cause reload of the donor roll at some subsequent location on the image;

locating within the low resolution version of the image a destination object a predetermined distance from the source object;

determining a destination coverage of toner to be deposited over a destination region at the destination object;

if the destination coverage is less than a predetermined reload value;

determining a dimension of the source object;

determining a dimension of the destination object;

comparing the dimension of the source object to a predetermined critical source dimension;

comparing the dimension of the destination object to a predetermined critical destination dimension; and locating an area subject to reload artifact if the dimension of the source object is greater than the predetermined critical source dimension and the dimension of the destination object is greater than the predetermined critical destination dimension.

2. The method of claim 1, wherein providing a low resolution version of the image comprises providing the entire image.

3. The method of claim 1, wherein providing a low resolution version of the image comprises providing a one-eighth resolution thumbnail of the image.

4. The method of claim 1, further comprising: if the destination object is capable of exhibiting reload, setting the magnetic roll to full speed.

5. The method of claim 1, further comprising: if the destination object is not capable of exhibiting reload, setting the magnetic roll to a reduced speed.

6. The method of claim 1, wherein the electrophotographic printing system further includes a second donor roll and further comprising: locating a second destination region capable of exhibiting reload substantially one rotation of the second donor roll subsequent to the source object within the low resolution version of the image.

7. The method of claim 6, wherein locating a second destination region capable of exhibiting reload comprises:

determining a coverage level of the second destination region; and comparing the coverage level of the second destination region to a second destination threshold, such that if the coverage level of the second destination region is at least as great as the second destination threshold, the second destination region is capable of exhibiting reload.

8. The method of claim 1, wherein the electrophotographic printing system includes a second donor roll and further comprising:

locating a second source region capable of causing reload substantially one rotation of the second donor roll prior to the destination object within the low resolution version of the image.

9. The method of claim 8, wherein locating a second source region capable of causing reload comprises:

determining a coverage level of the second source region; and comparing the coverage level of the second source region to a second source threshold, such that if the coverage level of the second source region is at least as great as the second source threshold, the second source region is capable of causing reload.

10. The method of claim 1, wherein the image to be printed comprises a template portion and a variable data portion and wherein providing a low resolution version of the image comprises providing the entire image.

11. The method of claim 10, wherein locating a source region capable of causing reload within the image portion comprises locating a source region in the template portion.

12. The method of claim 10, wherein locating a destination region capable of exhibit reload comprises locating a destination region in the variable data portion.

* * * * *